Aug. 8, 1950     E. L. HINKSON     2,518,318

SWIVEL JOINT

Filed Nov. 17, 1947

INVENTOR.
Edgar L. Hinkson.
BY
Harness, Dickey & Pierce.
ATTORNEYS.

Patented Aug. 8, 1950

2,518,318

UNITED STATES PATENT OFFICE 2,518,318

SWIVEL JOINT

Edgar L. Hinkson, Detroit, Mich., assignor to The General Detroit Corporation, Detroit, Mich., a corporation of Michigan Application November 17, 1947, Serial No. 786,428

4 Claims. (Cl. 285—97.8)

The present invention relates to swivel joints, and more particularly to improved swivel joints for connecting high pressure fluid conduits.

The principal objects of the invention are to provide an improved swivel joint which is simple in design, economical of construction, and reliable and efficient in operation; and to provide such an improved swivel joint peculiarly adapted for association with high pressure fluid conduits.

Other and more detailed objects will become apparent from a consideration of the accompanying drawing, the following specification and the appended claims.

Figure 1:
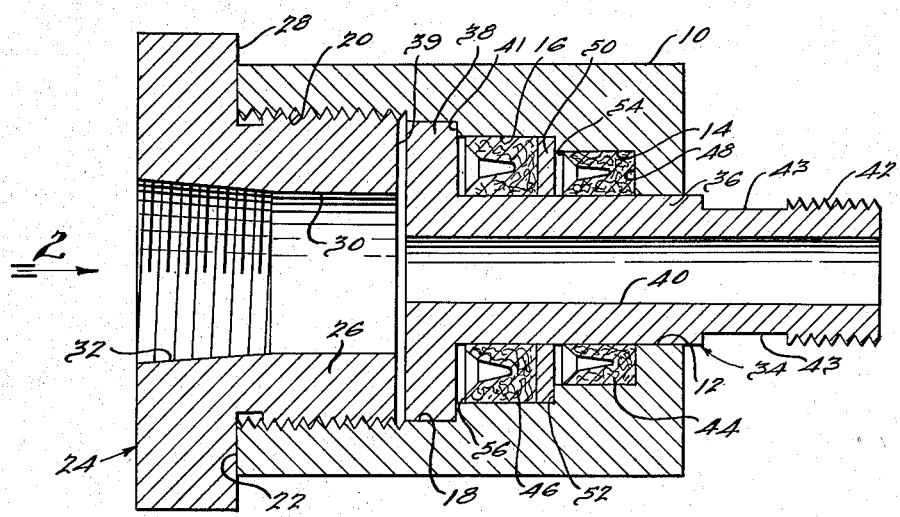
Figure 1 is a longitudinal sectional view of a joint embodying the invention.
Figure 2:
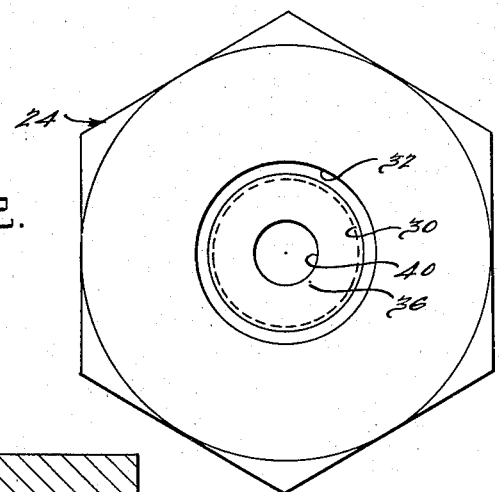
Fig. 2 is an elevational view of the structure illustrated in Fig. 1 taken in the direction of the arrow 2; and, Fig. 3 is a sectional view of the body of the swivel joint illustrated in Fig. 1.
Figure 3:
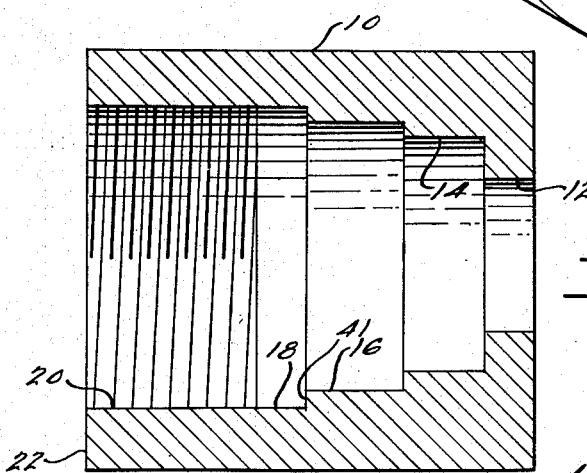

Referring to the drawing, the swivel joint comprises a body 10 having a cylindrical exterior and an axial bore extending therethrough, and having a plurality of portions 12, 14, 16, 18 and 20 of progressively increasing diameters varying from the portion 12 of smallest diameter at one end of the body to the portion 20 of largest diameter at the other end of the body. The largest portion 20 is internally threaded and the adjacent end of the body 10 defines an annular seat 22. A coupling member 24 having an externally threaded shank portion 26 and a radially outwardly projecting flank 28 is threaded into the internally threaded portion 20 of the body 10 until the flange 28 on the coupling member 24 seats against the annular seat 22 formed on the body member 10. The coupling member 24 has an axial bore 30 therethrough, the outer portion of which is provided with internal threads 32 for connection to a discharge pipe or coupling. The peripheral portion of the flange 28 is hexagonally shaped as illustrated in Fig. 2 for engagement by a conventional wrench or tool.

A second coupling member 34 has a shank portion 36 which extends through the portions 12, 14 and 16 of the body member and freely fits the end portion 12 of smallest diameter. At its inner end the coupling member 34 has an integrally formed disk-like head 38 which loosely fits the body portion 18 and has a loose fit between the inner axial face 39 of the coupling member 24 and an opposed cooperating annular shoulder 41 on the body 10 intermediate the portions 16 and 18 of the bore. The just described loose fit of the head 38 permits the coupling member 34 to be freely rotated relative to the body 10 at all times. The coupling member 34 has a bore 40 extending axially therethrough and is provided at its outer end with an externally threaded portion 42 adapted for connection to a pipe or other source of high pressure fluid. Externally of the body 10, and adjacent the threaded portion 42 the shank portion 36 of the coupling 34 is formed to provide a pair of opposed flats 43 for engagement by a conventional wrench or the like. The bore portions 14 and 16 of the body serve to house packings 44 and 46 respectively, the packing 44 in the portion 14 seating on an annular shoulder 48 on the body intermediate the portions 12 and 14. The packing 46 seats against an annular washer 50 which surrounds the shank 36 of the coupling member 34 and bears against an annular shoulder 52 formed on the body 10 intermediate the portions 14 and 16.

The packings 44 and 46 preferably have feathered edges as indicated at 54 and 56, which are forced against the shank 36 of the coupling member 34 and the cooperating surfaces of the body portions 14 and 16 to form tight seals between the body 10 and the coupling member 34. Also, the packings 44 and 46 and the bore portions 14 and 16 are so proportioned that the shoulders 52 and 41 prevent the crushing of the packings 44 and 46 by the washer 50 and the head 38, respectively.

While only one embodiment of the invention has been illustrated and described in detail, it will be readily apparent to those skilled in the art that numerous modifications and changes may be made without departing from the spirit of the invention or from the scope of the appended claims.

I claim:

1. A swivel joint for high pressure fluid conduits comprising a body member having an axial bore therethrough including a portion of reduced diameter at one end, a coupling member extending through and freely fitting said portion of reduced diameter, said coupling member having an annular radially outwardly extending flange disposed within and loosely fitting said body member, packing means disposed intermediate said flange and said one end, a second coupling member mounted on the other end of said body member, said second coupling member and said body member having cooperating means limiting movement of the former inwardly of the latter, said body member having an axially presenting shoulder cooperating with the inner axial face of said second coupling member to loosely confine said flange, and said coupling members communicating at their inner ends with the interior of said body member between said flange and said other end of said body member.

2. A swivel joint for high pressure fluid conduits comprising a body member having an axial bore therethrough including a portion of reduced diameter at one end and an annular seat at its other end, a coupling member projecting through and freely fitting said portion of reduced diameter, said coupling member having an enlarged head disposed within and loosely fitting said body member, sealing means disposed intermediate said head and said one end, a second coupling member mounted on said body and including a flange portion engaging said seat to limit movement of said second coupling member inwardly of said body member, said body member having an axially presenting shoulder cooperating with the inner axial face of said second coupling member to loosely confine said head.

3. A swivel joint for high pressure fluid conduits comprising a body member having an axial bore therethrough including a portion of reduced diameter at one end, a portion of enlarged diameter adjacent the other end and intermediate portions of intermediate diameters defining a shoulder on said body member, a coupling member adapted for connection to a fluid conduit and extending through said intermediate portion and said portion of reduced diameter and freely fitting the latter, said coupling member having an enlarged head loosely fitting said portion of enlarged diameter, packing means disposed in and individual to said intermediate portions, a washer disposed between said packing means and engaging said shoulder to prevent contact between and crushing of said packing means, said body having a shoulder between said intermediate portions and said portion of enlarged diameter adapted to engage said head to prevent movement of the latter to crush said packing means, and a second coupling member adapted for connection to a fluid conduit and mounted on said body member at said other end, said second coupling member and said body having cooperating means limiting movement of the former inwardly of the latter, whereby said head is loosely confined between said second named shoulder and the inner axial face of said second coupling member.

4. A swivel joint for high pressure fluid conduits comprising a body member having an axial bore therethrough including a plurality of portions of progressively increasing diameters from a portion of smallest diameter at one end of said member to an internally threaded portion of largest diameter at the other end of said member and a plurality of shoulders intermediate adjacent pairs of said portions, said member having an annular seat at its other end, a coupling member adapted for connection to a fluid conduit and threadedly engaging said body member and having an annular portion engaging said seat, a second coupling member adapted for connection to a fluid conduit and having a disk-like head loosely fitting the one of said plurality of portions adjacent said threaded portion and a shank portion extending through and freely fitting said portion of smallest diameter, said head being loosely confined between one of said shoulders and the inner axial face of said first named coupling member, packing means disposed in and individual to a pair of bore portions intermediate said portion of smallest diameter and said one of said portions, and washer means mounted intermediate said packing means and engaging another of said shoulders to prevent contact and resulting crushing of said packing means.

EDGAR L. HINKSON.

REFERENCES CITED

The following references are of record in the file of this patent:

UNITED STATES PATENTS

| Number | Name | Date |
|---|---|---|
| 2,356,351 | Phillips | Aug. 22, 1944 |